(12) United States Patent
Mazzocco et al.

(10) Patent No.: US 10,479,163 B2
(45) Date of Patent: Nov. 19, 2019

(54) METHOD FOR CONTROLLING A THERMAL COMFORT CONTROL SYSTEM FOR RIDE SHARE VEHICLES

(71) Applicant: GM GLOBAL TECHNOLOGY OPERATIONS LLC, Detroit, MI (US)

(72) Inventors: Nicholas Mazzocco, Clawson, MI (US); Jeffrey M Pleune, Rochester Hills, MI (US); Louis Savich, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 15/812,035

(22) Filed: Nov. 14, 2017

(65) Prior Publication Data
US 2019/0143784 A1 May 16, 2019

(51) Int. Cl.
*B60H 1/00* (2006.01)
*B60N 2/56* (2006.01)

(52) U.S. Cl.
CPC ..... *B60H 1/00285* (2013.01); *B60H 1/00792* (2013.01); *B60H 1/00892* (2013.01); *B60N 2/5621* (2013.01); *B60N 2/5678* (2013.01); *B60H 2001/00942* (2013.01)

(58) Field of Classification Search
USPC ...................................... 702/36; 1/1; 701/36
See application file for complete search history.

(56) References Cited

U.S. PATENT DOCUMENTS

| | | | |
|---|---|---|---|
| 6,789,607 B1 * | 9/2004 | Jun | B60H 1/00678 165/203 |
| 10,052,935 B2 * | 8/2018 | Dickow | G08G 1/0967 |
| 2014/0244106 A1 * | 8/2014 | Singer | G06F 17/00 701/36 |
| 2015/0239321 A1 * | 8/2015 | Muller | B60H 1/00792 297/180.1 |
| 2016/0176264 A1 * | 6/2016 | Jablonski | B60H 1/0065 165/203 |
| 2017/0291468 A1 * | 10/2017 | Jung | B60H 1/00064 |
| 2017/0349026 A1 * | 12/2017 | Kim | B60H 1/00514 |
| 2018/0251007 A1 * | 9/2018 | Neveu | B60N 2/5678 |

* cited by examiner

*Primary Examiner* — Masud Ahmed

(57) ABSTRACT

A method for controlling a thermal comfort control system for ride share vehicles includes providing a plurality of occupant seats in a vehicle cabin and controlling a cabin set temperature using a cabin comfort control system configured to adjust a plurality of HVAC functions. At least one thermal comfort parameter is adjusted at a number of the plurality of occupant seats using at least one seat comfort control system. Adjusting the at least one thermal comfort parameter causes the cabin control module to adjust the set temperature of the vehicle cabin.

18 Claims, 4 Drawing Sheets

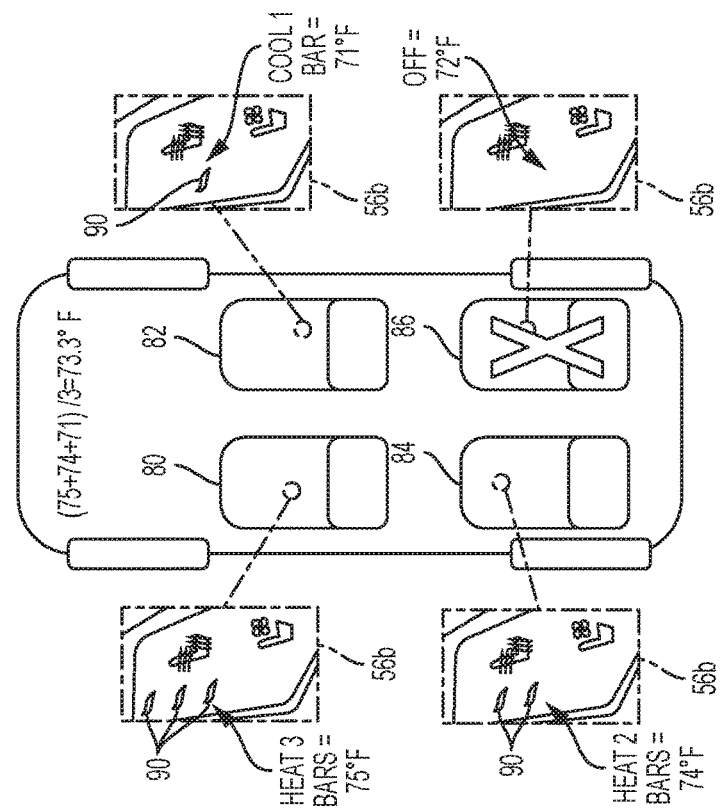
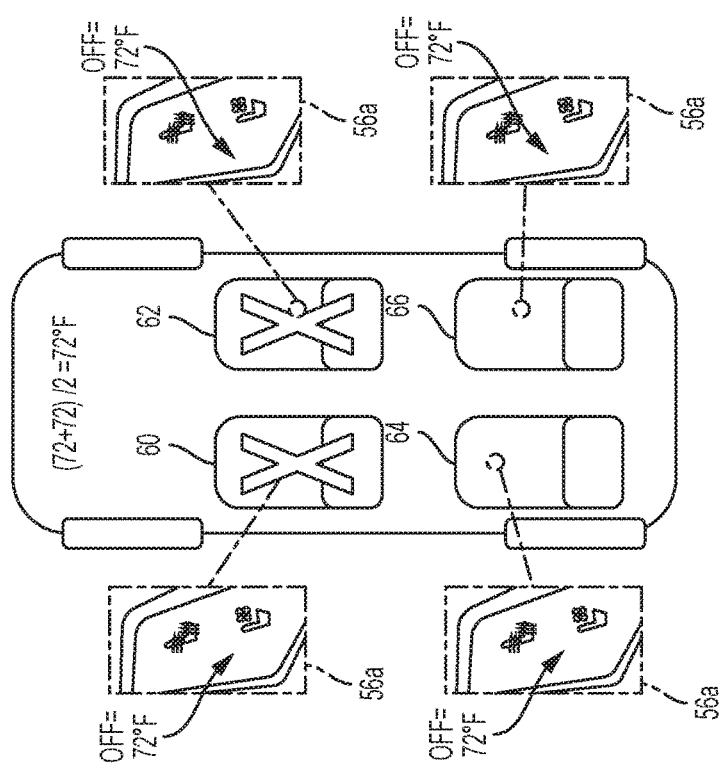
FIG. 3b
FIG. 3a

METHOD FOR CONTROLLING A THERMAL COMFORT CONTROL SYSTEM FOR RIDE SHARE VEHICLES

FIELD

The invention relates generally to heating and air conditioning systems, and more particularly to a method for controlling a thermal comfort control system for ride share vehicles.

BACKGROUND

The statements in this section merely provide background information related to the present disclosure and may or may not constitute prior art.

A vehicle may include a heating/ventilation air conditioning (HVAC) system, such as a thermal comfort control system. In vehicle thermal comfort control systems, a passenger may set a desired temperature for the passenger cabin, or alternatively, operate the thermal comfort control system until a desired temperature within the passenger cabin is reached.

Further, some vehicles may include multi-zone comfort control systems, e.g., ride-share/multi-occupant vehicle, buses, etc. In these systems, passengers may operate a dedicated comfort control system to adjust the temperature in a particular passenger zone of the vehicle. Here, the comfort control system may include one or more thermal comfort control features/functions positioned in each passenger zone.

One drawback of these comfort control systems is that the occupant may become uncomfortable when moving about the cabin of the vehicle which can present a climatically different environment.

Therefore, while previous comfort control systems for vehicles are useful for their intended purpose, there is room in the art for an improved occupant thermal comfort control system for ride share vehicles.

SUMMARY

One or more exemplary embodiments address the above issue by providing a method for controlling a thermal comfort control system for ride share vehicles.

A method for controlling a thermal comfort control system for ride share vehicles in accordance with aspects of an exemplary embodiment includes providing a plurality of occupant seats in a vehicle cabin. And another aspect includes controlling a set temperature within the vehicle cabin using a cabin comfort control system configured to adjust a plurality of HVAC functions. And still another aspect adjusting at least one thermal comfort parameter at a number of the plurality of occupant seats using at least one seat comfort control system, wherein adjusting the at least one thermal comfort parameter causes the cabin comfort control system to adjust the set temperature of the vehicle cabin.

A further aspect in accordance with the exemplary embodiment includes adjusting the set temperature within the vehicle cabin is based on an average value of inputs from the at least one seat comfort control system. And another aspect wherein the set temperature is increased if the average value of the seat inputs is greater than the set temperature. And still another aspect wherein the set temperature is decreased if the average value of the seat inputs is less than the set temperature. And yet another aspect wherein the at least one seat comfort control system is a heated seat.

Still further aspects in accordance with the exemplary embodiment wherein the at least one seat comfort control system is a ventilated seat. And a further aspect wherein the at least seat one comfort control system is a heated/ventilated seat. And another aspect wherein the at least one seat comfort control system is a local HVAC system. And yet another aspect includes providing a cabin temperature monitoring device at the plurality of occupant seats.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3a is an illustration of a multi-occupant/ride share vehicle having two occupants in accordance with aspects of the exemplary embodiment;

FIG. 3b is an illustration of a multi-occupant/ride share vehicle having three occupants in accordance with aspects of the exemplary embodiment.

DETAILED DESCRIPTION

The following description is merely exemplary in nature and is not intended to limit the present disclosure, application, or uses.

Figure 1:
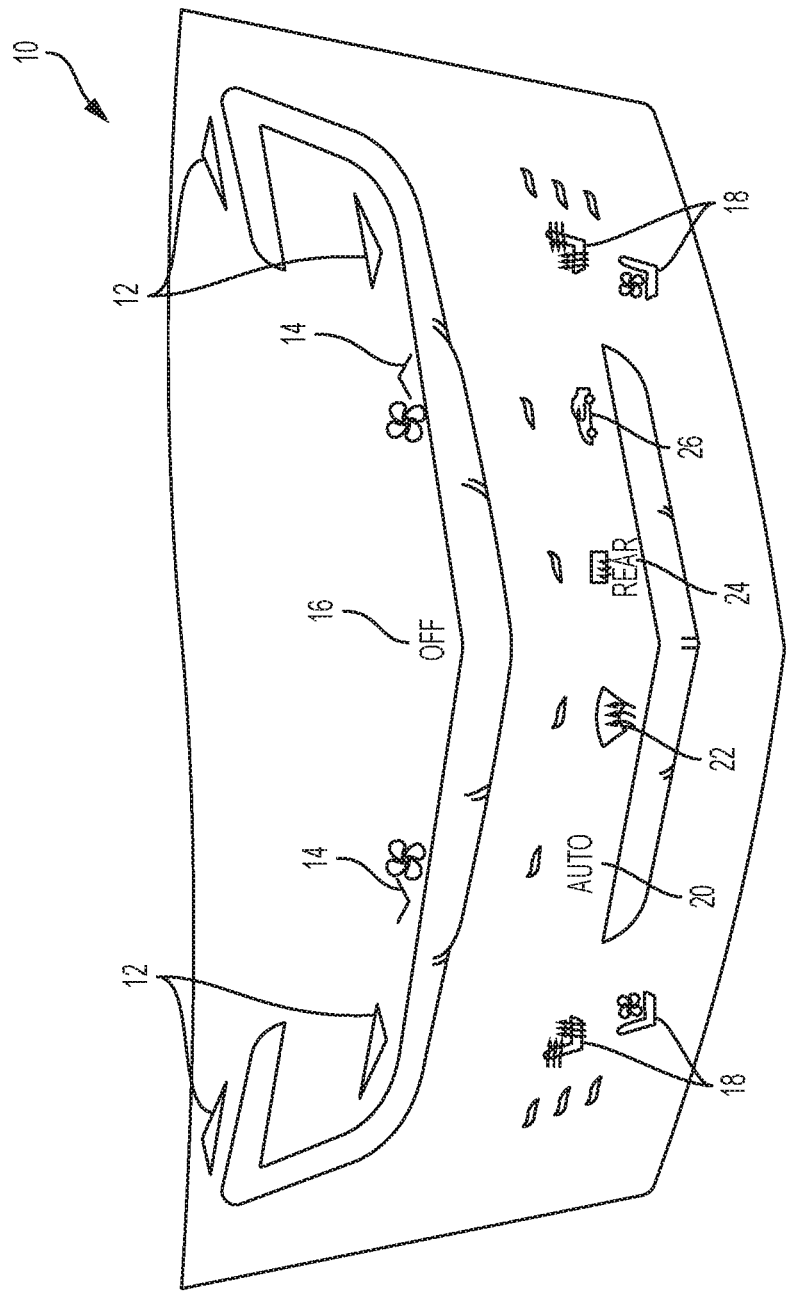
FIG. 1 is an illustration of a multi-function control panel for a thermal comfort control system.

In a typical car application, overall cabin comfort is controlled at an instrument control panel. With reference to FIG. 1, an illustration of a multi-function control panel 10 for a thermal comfort control system is provided. The multi-function control panel 10 includes driver and passenger temperature controls 12, fan controls 14, On/Off control 16, heated/ventilated seat controls 18, automatic HVAC control 20, defrost control 22, defogger control 24, and an air recirculation control 26.

The outlet and overall cabin temperature is controlled by the temperature controls 12. When in AUTO 20 mode, comfort control system would adjust the fan control 14 and mode control (not shown), HVAC temperature vent/vane positions (not shown), and recirculation door positions (not shown) to achieve a temperature comfortable for the vehicle occupant(s). In a shared vehicle application (where each occupant may not know each other, and/or new occupants may cycle through during the travel route) it may be preferred to eliminate manual cabin HVAC control and lock the HVAC system to one set point to avoid conflict amongst occupants to set the overall cabin temperature, mode, fan control etc. to their individual preference.

Figure 2:
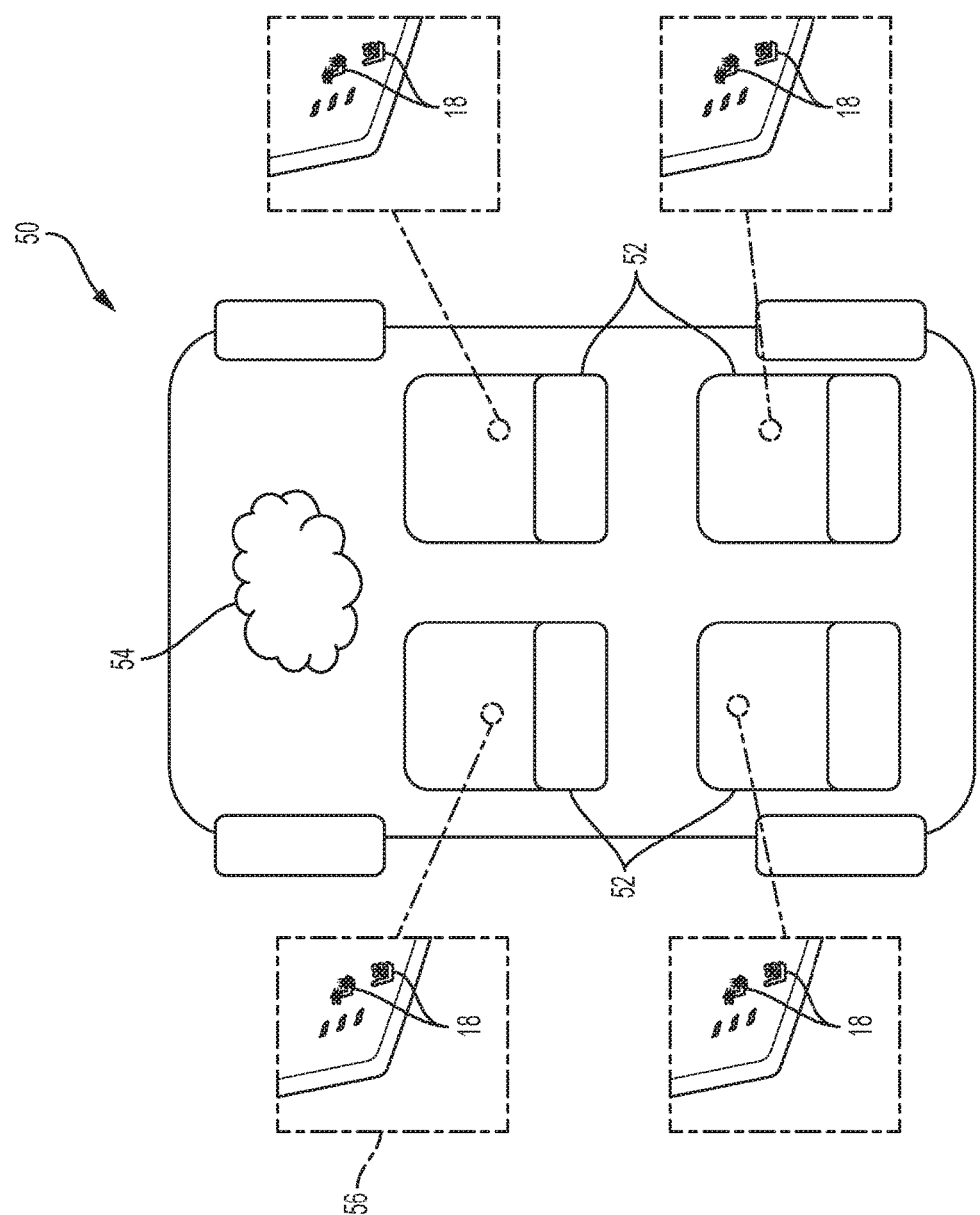
FIG. 2 is an illustration of a multi-occupant/ride share vehicle having a comfort control system associated with each seat in accordance with aspects of an exemplary embodiment.

Referring now to FIG. 2, an illustration of a multi-occupant/ride share vehicle 50 having a seat comfort control system 56 associated with each seat in accordance with aspects of an exemplary embodiment is provided. Each seat comfort control system 56 may include at least one of a heated/ventilated seat control, a heated seat control only, a ventilated seat control only, and/or a local HVAC system control (not shown). Localized comfort control systems 56 allow occupants to control individual comfort beyond what the cabin is set to but is not adjustable. Thus, if the cabin is too cold/too warm for a particular occupant, that occupant can turn their heated/ventilated seat on.

The multi-occupant/ride share vehicle 50 is provided with a plurality of occupant seats 52 within the vehicle cabin. Using the multi-function control panel 10, the cabin temperature 54 can be set and code locked to a predetermined set temperature whereby the cabin comfort control system will function continuously to maintain the vehicle cabin at this set temperature, e.g., 72° F.

With reference to FIGS. 3a & 3b, illustrations of a multi-occupant/ride share vehicle having two (FIG. 3a) and three (FIG. 3b) occupants, respectively, in accordance with aspects of the exemplary embodiment are provided. Even with the cabin temperature being maintained by the cabin comfort control system, it may be beneficial to still have some level of adjustment of the overall cabin temperature. To avoid conflict of occupants it may be beneficial for this control to be private to each occupant.

To do this, the seat comfort control system 56 can be used to shift the overall cabin temperature set point up or down. Adjusting the cabin set point temperature within the vehicle cabin is based on an average value of inputs received by the cabin control system from the at least one seat comfort control system 56. Weighting of seat inputs may be adjustable through vehicle calibration for example a seat input value of five (5) will have a greater effect on the set point temperature than a seat input value of two (2).

Referring to FIG. 3a, note that seats 60 and 62 are marked with "X" indicating that the seat is empty. Seats 64 and 66 are occupied in this ride share example in accordance with aspects of the exemplary embodiment. The set point cabin temperature is provided at 72° F. with each seat comfort control system 56a being turned off. Because seats 60 and 62 are empty, a seat input value will not be provided to the cabin comfort control system. Although seat inputs will be received by the cabin comfort control system from seats 64 and 66, the comfort settings were not changed by the occupants and remain at 72° F. The cabin comfort control system will compute the average of these two seat input values, i.e., (72+72)/2=72, and then make an adjustment (increase or decrease) to the set point temperature based on the difference between the set point temperature and the average of the seat input values. Thus, in this case, with the set point temperature being 72 and the average of the seat input values being 72, the resulting adjustment made will be zero (72−72=0) or no adjustment.

Referring now to FIG. 3b, another example in accordance with the exemplary embodiment wherein three occupants are seated in the ride share vehicle. Note that only seat 86 (marked with "X") is empty while seats 80, 82, and 84 are occupied. Again, the set point cabin temperature is provided at 72° F. with each seat comfort control system 56b being turned on, except the seat comfort control system associated with seat 86 which is empty. Because seat 86 is empty, a seat input value will not be provided to the cabin comfort control system. Starting at seat 80, the seat comfort control system has been increased by three (3) heat bars 90 (for example purposes only 1 active heat bar equals a 1° F. increase in temperature) setting a seat input value from 72 degrees to 75 degrees. For seat 82, the occupant increased the seat comfort control system by one (1) heat bar increasing the seat value to 73 degrees, and at seat 84 the occupant increased the seat comfort control system two (2) heat bars to 74 degrees.

The cabin comfort control system will compute the average of these three seat input values, i.e., (75+74+73)/3=74, and then make an adjustment (increase or decrease) to the cabin set point temperature based on the difference between the current cabin set point temperature and the average of the seat input values. Thus, in this case, with the set point temperature being 72 and the average of the seat input values being 73.3, the resulting adjustment made will be 1.3° F. (73.3−72=1.3). It is appreciated that the same principle to compute the adjustment in cabin set point temperature will apply if an occupant wanted to decrease the temperature of the cabin by simply decreasing the seat comfort control system to below 72° F. The seat input values can be received from a plurality of sensing devices including, but not limited to, a seat mass sensor, a seat fan motor ROM, and seat occupant video camera.

Figure 4:
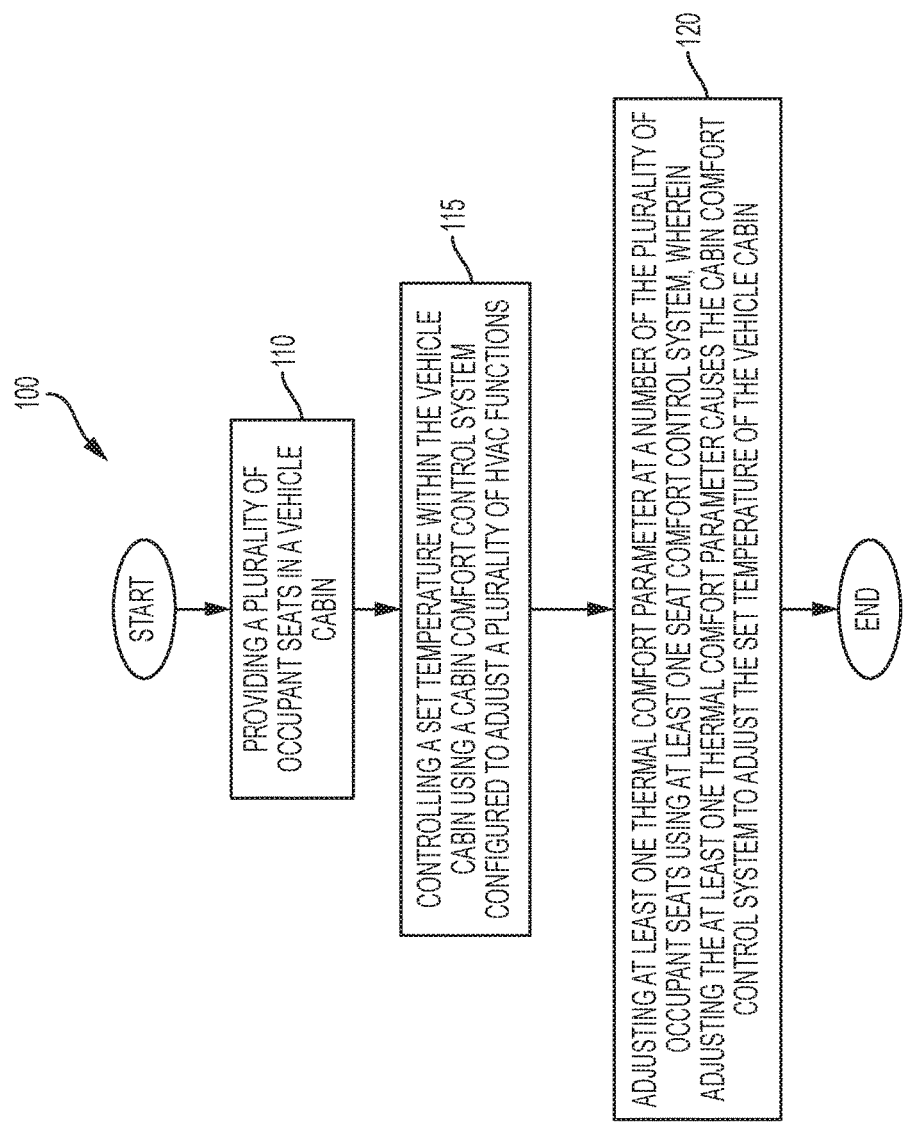
FIG. 4 is an illustration of an algorithm of a method for controlling a thermal comfort control system for ride share vehicles in accordance with aspects of the exemplary embodiment.

Referring now to FIG. 4, an algorithm of a method for controlling a thermal comfort control system for ride share vehicles in accordance with aspects of the exemplary embodiment is provided. The method begins at block 110 with providing a plurality of occupant seats in a vehicle cabin. The vehicle may be a passenger van to a commercial travel bus without exceeding the scope of the exemplary embodiment.

Next at block 115, the method continues with controlling a set temperature within the vehicle cabin using a cabin comfort control system configured to adjust a plurality of HVAC functions. And at block 120, the method continues with adjusting at least one thermal comfort parameter at a number of the plurality of occupant seats using at least one seat comfort control system, wherein adjusting the at least one thermal comfort parameter causes the cabin comfort control system to adjust the set temperature of the vehicle cabin. In accordance with aspects of the exemplary embodiment, the set temperature is increased if the average value of the seat inputs is greater than the set temperature, and the set temperature is decreased if the average value of the seat inputs is less than the set temperature. An occupant may also be provided a cabin temperature monitoring device at their seat to view the cabin temperature or a mobile app could be used for such purpose in accordance with aspects of the exemplary embodiment.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for controlling a thermal comfort control system for vehicles comprising:
   providing a plurality of occupant seats in a vehicle cabin;
   controlling a set temperature within the vehicle cabin by a multi-function control panel using a cabin comfort control system configured to adjust a plurality of HVAC functions; and
   adjusting at least one thermal comfort parameter at a number of the plurality of occupant seats using at least one seat comfort control system,
   wherein adjusting the at least one thermal comfort parameter causes the cabin comfort control system to automatically adjust the set temperature of the vehicle cabin either by decreasing or increasing the set temperature within the vehicle cabin in accordance with the at least one thermal comfort parameter.

2. The method of claim 1 further comprising adjusting the set temperature within the vehicle cabin is based on an average value of inputs from the at least one seat comfort control system.

3. The method of claim 2 wherein the set temperature is increased if the average value of the seat inputs is greater than the set temperature.

4. The method of claim 2 wherein the set temperature is decreased if the average value of the seat inputs is less than the set temperature.

5. The method of claim 1 wherein the at least one seat comfort control system is a heated seat.

6. The method of claim 1 wherein the at least one seat comfort control system is a ventilated seat.

7. The method of claim 1 wherein the at least one comfort seat control system is a heated/ventilated seat.

8. The method of claim 1 wherein the at least one seat comfort control system is a local HVAC system.

9. The method of claim 1 further comprising providing a cabin temperature monitoring device at the plurality of occupant seats.

10. A method for controlling a thermal comfort control system for vehicles comprising:
providing a plurality of occupant seats in a vehicle cabin;
controlling a set temperature within the vehicle cabin by a multi-function control panel using a cabin comfort control system configured to adjust a plurality of HVAC functions; and
adjusting at least one thermal comfort parameter at a number of the plurality of occupant seats using at least one seat comfort control system,
wherein adjusting the at least one thermal comfort parameter causes the cabin comfort control system to automatically adjust the set temperature of the vehicle cabin either by decreasing or increasing the set temperature within the vehicle cabin in accordance with the at least one thermal comfort parameter, wherein adjusting the set temperature within the vehicle cabin is based on an average value of inputs from the at least one seat comfort control system.

11. The method of claim 10 wherein the set temperature is increased if the average value of the seat inputs is greater than the set temperature.

12. The method of claim 10 wherein the set temperature is decreased if the average value of the seat inputs is less than the set temperature.

13. The method of claim 10 wherein the at least one seat comfort control system is a heated seat.

14. The method of claim 10 wherein the at least one seat comfort control system is a ventilated seat.

15. The method of claim 10 wherein the at least one seat comfort control system is a heated/ventilated seat.

16. The method of claim 10 wherein the at least seat one comfort control system is a local HVAC system.

17. The method of claim 10 further comprising providing a cabin temperature monitoring device at the plurality of occupant seats.

18. A method for controlling a thermal comfort control system for vehicles comprising:
providing a plurality of occupant seats in a vehicle cabin;
controlling a set temperature within the vehicle cabin by a multi-function control panel using a cabin comfort control system configured to adjust a plurality of HVAC functions; and adjusting at least one thermal comfort parameter at a number of the plurality of occupant seats using at least one seat comfort control system,
wherein adjusting the at least one thermal comfort parameter causes the cabin comfort control system to automatically adjust the set temperature of the vehicle cabin either by decreasing or increasing the set temperature within the vehicle cabin in accordance with the at least one thermal comfort parameter, wherein adjusting the set temperature within the vehicle cabin is based on an average value of inputs from the at least one seat comfort control system
wherein the set temperature is increased if the average value of the seat inputs is greater than the set temperature,
wherein the set temperature is decreased if the average value of the seat inputs is less than the set temperature.

* * * * *